United States Patent
Tanaka (10) Patent No.: US 10,635,886 B2
(45) Date of Patent: Apr. 28, 2020

(54) MANAGING SYSTEM, PORTABLE TERMINAL DEVICE, MANAGING METHOD, INFORMATION PROCESSING METHOD, AND PROGRAM

(71) Applicant: NS Solutions Corporation, Tokyo (JP)

(72) Inventor: Shinichiro Tanaka, Tokyo (JP)

(73) Assignee: NS SOLUTIONS CORPORATION, Tokyo (JP)

(*) Notice: Subject to any disclaimer, the term of this patent is extended or adjusted under 35 U.S.C. 154(b) by 176 days.

(21) Appl. No.: 15/509,809

(22) PCT Filed: Sep. 15, 2015

(86) PCT No.: PCT/JP2015/076195
§ 371 (c)(1),
(2) Date: Mar. 8, 2017

(87) PCT Pub. No.: WO2016/043197
PCT Pub. Date: Mar. 24, 2016

(65) Prior Publication Data
US 2017/0286749 A1    Oct. 5, 2017

(30) Foreign Application Priority Data

Sep. 16, 2014    (JP) .................................. 2014-188102

(51) Int. Cl.
*G06K 9/00* (2006.01)
*H04L 9/32* (2006.01)
(Continued)

(52) U.S. Cl.
CPC ......... *G06K 9/00154* (2013.01); *G06F 21/16* (2013.01); *G06F 21/64* (2013.01);
(Continued)

(58) Field of Classification Search
CPC ............ G06K 9/00154; G06K 9/00463; G06F 21/16; G06F 21/64; G06Q 10/10; G06Q 50/18; H04L 9/32
See application file for complete search history.

(56) References Cited

U.S. PATENT DOCUMENTS 6,209,090 B1 * 3/2001 Aisenberg ............... G06F 21/64
380/247
6,367,013 B1 * 4/2002 Bisbee .................... G06Q 20/00
713/158
(Continued)

FOREIGN PATENT DOCUMENTS

EP    2 189 930 A1    5/2010
JP    2003-085471 A    3/2003
(Continued)

OTHER PUBLICATIONS

Translation of the International Preliminary Report on Patentability of related International Patent Application No. PCT/JP2015/076195 dated Mar. 16, 2017.
(Continued)

*Primary Examiner* — Jonathan S Lee
(74) *Attorney, Agent, or Firm* — Arent Fox, LLP (57) ABSTRACT

The present invention solves the problem by having: a first recording unit which accepts a handwritten electronic signature by a transactor and records the handwritten electronic signature in an electronic document; a second recording unit which records record information including transaction position information at a time that the handwritten electronic signature is recorded, in image data of the electronic document where the handwritten electronic signature is recorded by the first recording unit; and a managing unit which manages the record information recorded by the second recording unit and the image data where the record infor-
(Continued)

mation is recorded as managing information, while associating the record information with the image data.

10 Claims, 9 Drawing Sheets

(51) Int. Cl.
    *G06F 21/64*     (2013.01)
    *G06F 21/16*     (2013.01)
    *G06Q 10/10*     (2012.01)
    *G06Q 50/18*     (2012.01)

(52) U.S. Cl.
    CPC ......... *G06K 9/00463* (2013.01); *G06Q 10/10* (2013.01); *G06Q 50/18* (2013.01); *H04L 9/32* (2013.01)

(56) References Cited

U.S. PATENT DOCUMENTS

| | | | |
|---|---|---|---|
| 7,395,503 B1 * | 7/2008 | Pravetz | G06F 17/212 715/268 |
| 7,934,098 B1 | 4/2011 | Hahn et al. | |
| 8,228,299 B1 | 7/2012 | Maloney et al. | |
| 2008/0072334 A1 * | 3/2008 | Bailey | G06Q 10/10 726/28 |
| 2010/0131769 A1 | 5/2010 | Homma | |
| 2011/0087887 A1 * | 4/2011 | Luft | H04L 9/3247 713/178 |
| 2012/0072837 A1 | 3/2012 | Triola | |
| 2012/0192254 A1 * | 7/2012 | Garcia Perez | G06F 21/32 726/4 |

FOREIGN PATENT DOCUMENTS

| | | | |
|---|---|---|---|
| JP | 2005-222268 A | | 8/2005 |
| JP | 2008-103949 A | | 5/2008 |
| JP | 2008103949 A | * | 5/2008 |
| JP | 2010-128535 A | | 6/2010 |
| WO | WO 2012/049592 A2 | | 4/2012 |

OTHER PUBLICATIONS

Extended European Search Report of European Patent Application No. 15842361.6 dated Mar. 2, 2018.

* cited by examiner

| IDENTIFICATION ID | HASH VALUE | IMAGE DATA | CONTRACT PLANNED POSITION | CONTRACT POSITION | CONTRACT PLANNED DATE AND HOUR | CONTRACT DATE AND HOUR |
|---|---|---|---|---|---|---|
| A001 | 123NS7E5 | | X11,Y11 (±A) | | 2014.04.01 10:00(±B) | |
| ... | ... | ... | ... | ... | ... | ... |

| IDENTIFICATION ID | HASH VALUE | IMAGE DATA | CONTRACT PLANNED POSITION | CONTRACT POSITION | CONTRACT PLANNED DATE AND HOUR | CONTRACT DATE AND HOUR |
|---|---|---|---|---|---|---|
| A001 | 123NS7E5 | GIF1 | X11,Y11 (±A) | X12,Y12 | 2014.04.01 10:00(±B) | 2014.04.01 10:50 |
| ... | ... | ... | ... | ... | ... | ... |

MANAGING SYSTEM, PORTABLE TERMINAL DEVICE, MANAGING METHOD, INFORMATION PROCESSING METHOD, AND PROGRAM

CROSS-REFERENCE TO RELATED APPLICATIONS

This application is a National Stage entry of International Application No. PCT/JP2015/076195, filed Sep. 15, 2015, which claims priority to Japanese Patent Application No. 2014-188102, filed Sep. 16, 2014. The disclosures of the priority applications are incorporated in their entirety herein by reference.

TECHNICAL FIELD

The present invention relates to a managing system, a portable terminal device, a managing method, an information processing method, and a program.

BACKGROUND ART

Transactions made between business organizations or the like have been conventionally performed by way of paper medium documents. However, transactions by way of electronic document are being performed in recent years. Further, as a result that legislation such as an electronic signature law and an e-document law has been developed, there are performed transactions by way of exchanging electronic documents in which electronic signatures are available, such as an electronic contract in which a contract is made by exchanging electronic documents. Since documents are often repeatedly exchanged between business organizations or the like, it is beneficial to introduce a mechanism to perform transactions by way of electronic documents in which electronic signatures are available, even if some trouble is involved in initial use.

In recent years, transactions by way of electronic documents in which electronic signatures are available are performed not only between business organizations but have begun to be broadly performed. For example, there can be supposed a case where, in a contract for an individual made for the sake of construction for the individual, a signature in a construction request order or the like from the individual is electronically handwritten when a contract procedure is performed at the individual's home.

However, it is sometimes questionable whether or not that handwritten electronic signature is authentic and is difficult of proof, and further, there is a problem that a handwritten electronic signature, which is image data and copying and editing is possible, is weak as a method of confirming that the person himself has signed.

In order to solve the problem of identification and falsification as above, use of an electronic certificate is known, but there is a problem that use of the electronic certificate takes a lot of trouble with preparation. In a transaction with an individual, etc., it is often the case that documents are exchanged only once, and it is quite unlikely to use an electronic certificate which takes a lot of trouble with preparation for just one transaction.

It is convenient if a light user for personal use or the like can perform a transaction requiring a signature by way of an electronic document without trouble, so that electronic documents are likely to become widespread to thereby promote paperless.

CITATION LIST

Patent Literature

Patent Literature 1: Japanese Laid-open Patent Publication No. 2005-222268

SUMMARY OF INVENTION

Technical Problem

Patent Literature 1 discloses a technique to perform identification and prevention of falsification by using an electronic certificate in a transaction by way of an electronic document in which an electronic signature is available, but there is a problem that a procedure for preparation for using the electronic certificate takes a lot of trouble, resulting in that the technique is hard to be used personally or by a light user.

An object of the present invention is to enable even for a light user for personal use or the like to perform a transaction which requires a signature by way of an electronic document without trouble.

Solution to Problem

Thus, a managing system of the present invention has: a first recording unit which accepts a handwritten electronic signature by a transactor and records the handwritten electronic signature in an electronic document; a second recording unit which records record information including transaction position information at a time that the handwritten electronic signature is recorded, in image data of the electronic document where the handwritten electronic signature is recorded by the first recording unit; a managing unit which manages the record information recorded by the second recording unit and the image data where the record information is recorded as managing information, while associating the record information with the image data; and a judging unit which judges whether or not an allowable condition in a transaction using the electronic document is satisfied in correspondence with whether or not a transaction position indicated by the transaction position information included in the record information recorded by the second recording unit is within an allowable position range from a transaction planned position indicated by transaction planned position information having been registered in advance.

Advantageous Effects of Invention

According to the present invention, it is possible for a light user for personal use or the like to perform a transaction which requires a signature by way of an electronic document without trouble.

DESCRIPTION OF EMBODIMENTS

Hereinafter, embodiments of the present invention will be described based on the drawings.

Embodiment 1

Figure 1:
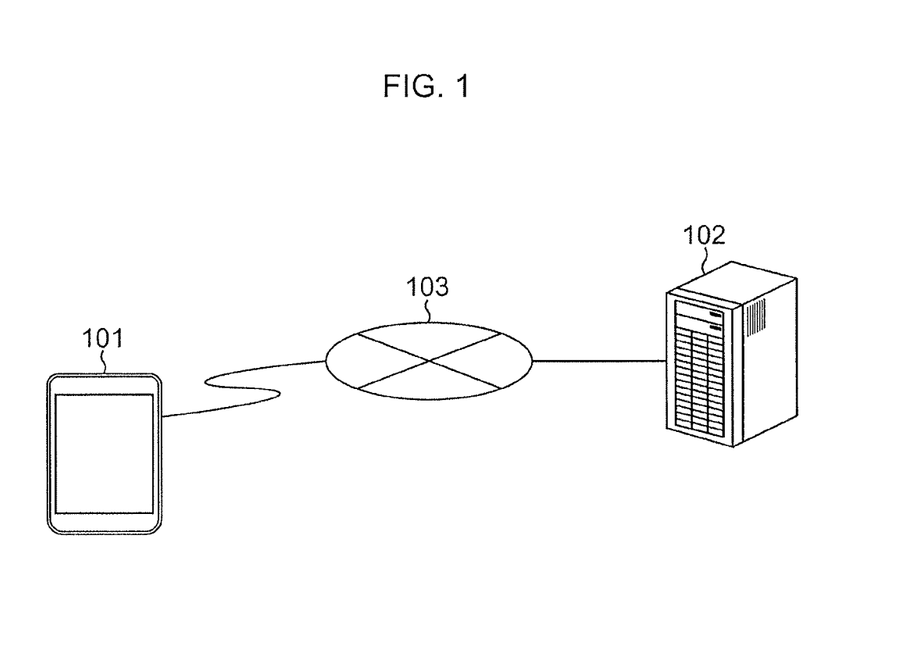
FIG. 1 is a view showing an example of a system configuration of an electronic contract system.

FIG. 1 is a view showing an example of a system configuration of an electronic contract system in the present embodiment.

The electronic contract system of the present embodiment includes a portable terminal device 101 and a server device 102, and the portable terminal device 101 and the server device 102 are communicably connected to each other via a network such as Internet 103. The electronic contract here means a contract made by exchanging, on the network, electronic documents (hereinafter, referred to as electronic contract documents) where electronic signatures are recorded, differently from a conventional contract made by exchanging paper documents on which seals are set. In the present embodiment, in particular, the contract is made by exchanging, on the network, electronic contract documents where electronic signatures having been handwritten (hereinafter, referred to as handwritten electronic signatures) are recorded. Since a stamp tax is unnecessary in the electronic contract, the electronic contract has an advantage of cost reduction or the like compared with the conventional contract using paper documents.

The portable terminal device 101 is a conveyable information processing device, such as a tablet type terminal device as iPad (registered trademark) or a smartphone, for example. Further, the portable terminal device 101 has a GPS (Global Positioning System) mounted thereon. The server device 102 manages various information regarding an electronic contract document used at a time of making an electronic contract and regarding the electronic contract. Here, the number of the portable terminal devices 101 and the server devices 102 is one, but the number thereof may be plural.

In the electronic contract system of the present embodiment, the portable terminal device 101 accepts a handwritten electronic signature by a party to a contract and records the handwritten electronic signature in an electronic contract document. The party to the contract is an example of a transactor in a transaction. Further, the portable terminal device 101 records position information (hereinafter, referred to as a contract position information) or the like of the device itself at a time that the handwritten electronic signature is recorded, in image data of the electronic contract document where the handwritten electronic signature is recorded. Then, the portable terminal device 101 transmits the image data where the contract position information or the like is recorded and the contract position information or the like to the server device 102, while associating the image data with the contract position information. The server device 102 manages the image data and the contract position information while associating the image data with the contract position information. The contract position information indicating the position of the device itself at the time that the electronic signature is recorded is an example of transaction position information indicating a place where the transaction is performed.

Further, the sever device 102 compares the contract position information or the like recorded in the image data with contract planned position information having been registered in advance, or collates the contract position information or the like recorded in the image data with the contract position information or the like managed while being associated with the image data. The contract planned position information indicating a contract planned position where the electronic contract using the electronic contract document is planned to be made is an example of transaction planned position information indicating a transaction planned position where the transaction is to be performed.

Figure 2:
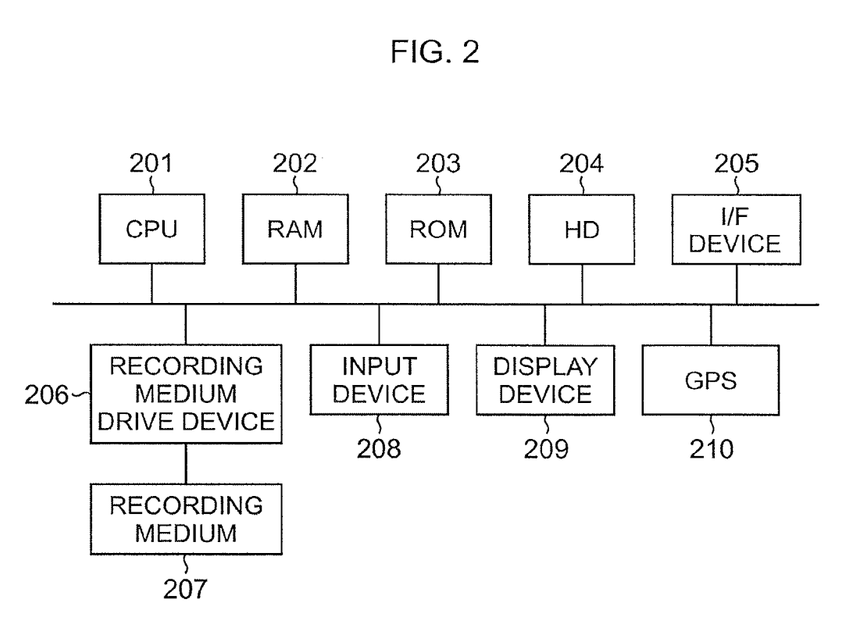
FIG. 2 is a diagram showing an example of a hardware configuration of a portable terminal device.

FIG. 2 is a diagram showing an example of a hardware configuration of the portable terminal device 101. A CPU 201 stores a program read from a HD 204 or a ROM 203 in a RAM 202 and executes the program, to thereby materialize a later-described software configuration of the portable terminal device 101, a processing of the portable terminal device 101 in a sequence diagram, and a processing regarding a flowchart of the portable terminal device 101. The RAM 202 is a main memory of the portable terminal device 101. The ROM 203 stores a program or the like which is first read at a time of power application of the portable terminal device 101. The HD 204 stores various programs and various data necessary for a processing that the CPU 201 performs.

An interface (I/F) device 205 is an interface for connecting the portable terminal device 101 to the network. The program of the portable terminal device 101 is provided from a recording medium 207 such as an SD card or a CD-ROM, for example, to the portable terminal device 101 via a recording medium drive device 206, or downloaded through the network. The recording medium drive device 206 may be built in the portable terminal device 101 or may be attached externally.

An input device 208 is a key, a button, an externally attachable mouse, a keyboard, or the like which is used for inputting various operation information to the portable terminal device 101. A display device 209 is a normal display used for displaying various information and a screen, a touch panel in which various operation information can be input by touching, or the like. A GPS 210 acquires position information of the portable terminal device 101.

Figure 3:
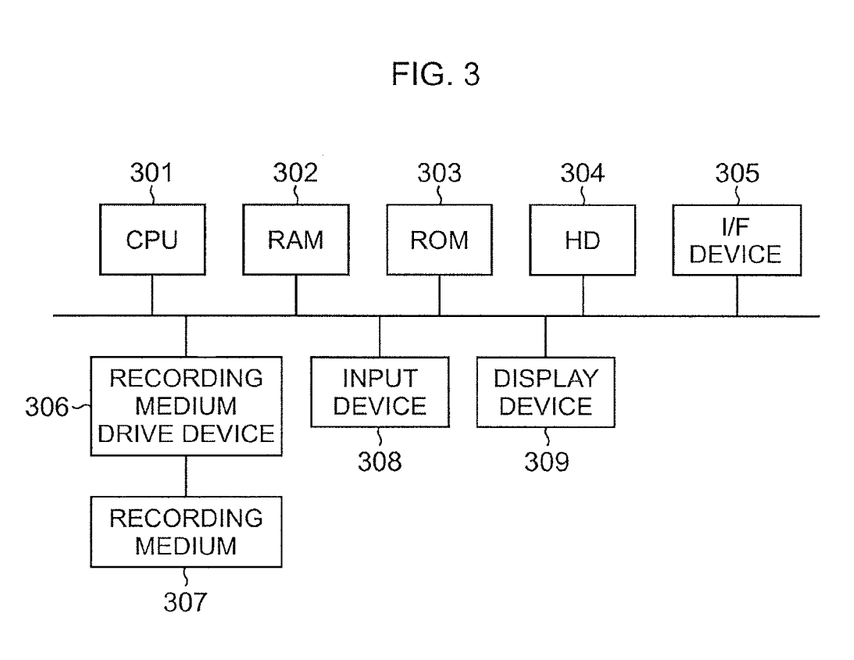
FIG. 3 is a diagram showing an example of a hardware configuration of a server device.

FIG. 3 is a diagram showing an example of a hardware configuration of the server device 102.

Functions of a CPU 301 to a display device 309 are similar to functions of the CPU 201 to the display device 209 explained by using FIG. 2. That is, the CPU 301 stores a program read from a HD 304 or a ROM 303 in a RAM 302 and executes the program, to thereby materials a later-described software configuration of the server device 102, a processing of the server device 102 in the sequence diagram, and a processing regarding a flowchart of the server device 102.

Figure 4:
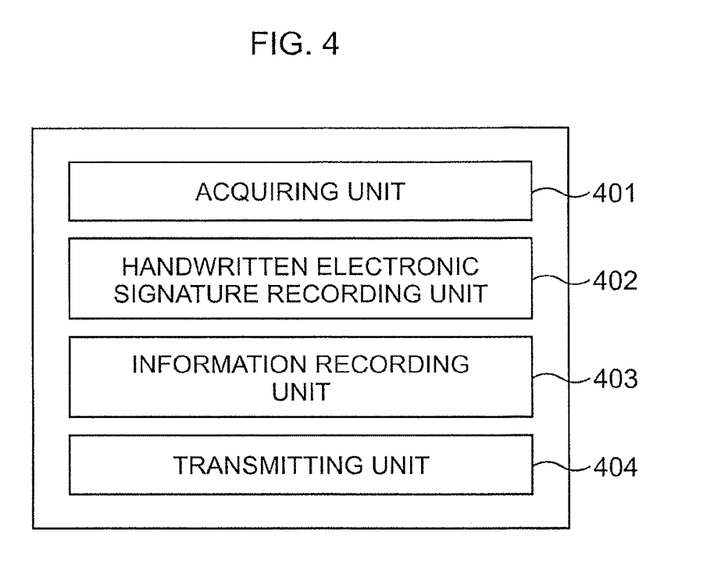
FIG. 4 is a diagram showing an example of a software configuration of the portable terminal device.

FIG. 4 is a diagram showing an example of the software configuration of the portable terminal device 101.

An acquiring unit 401 acquires the electronic contract document stored in the server device 102 via a network such as internet 103. Details of a processing of the acquiring unit 401 will be described later by using FIG. 6 and so on.

A handwritten electronic signature recording unit 402 records a handwritten electronic signature which is input with a stylus pen or the like via the display device 209, in an electronic contract document. Here, the handwritten electronic signature recording unit 402 is software which is installed in the portable terminal device 101 as a result that the CPU 201 executes a program for a handwritten electronic signature which is acquired from the server device 102 via the network such as internet 103. That is, the portable terminal device 101 acquires the program for the handwritten electronic signature from the server device 102 or the like in order to accept the handwritten electronic signature by a party to a contract and to record the handwritten electronic signature in the electronic contract document. Details of a processing of the handwritten electronic signature recording unit 402 will be described later by using FIGS. 6, 8, 9, and so on. Note that though the handwritten electronic signature in the present embodiment is described as one to be input with the stylus pen via the display device 209, it is not necessary to limit the input method thereto. For example, the handwritten electronic signature may be input with a finger via the display device 209 and may be input by operating a pointer or the like with a mouse.

An information recording unit 403 records record information including the contract position information as well as date and hour information (hereinafter, referred to as contract date and hour information) at a time that the handwritten electronic signature is recorded, in the image data of the electronic contract document where the handwritten electronic signature is recorded. The contract date and hour information is an example of transaction date and hour information which indicates a transaction date and hour when a transaction is performed. Note that the information recording unit 403 may record a timestamp as the contract date and hour information. The timestamp here means an electronic time certificate which is acquirable from a timestamp server device or the like.

A transmitting unit 404 transmits the image data where the record information is recorded and the record information to the server device 102 as managing information, while associating the image data with the record information. Note that this managing information is registered in a managing table described later by using FIG. 7A, FIG. 7B and so on.

Figure 5:
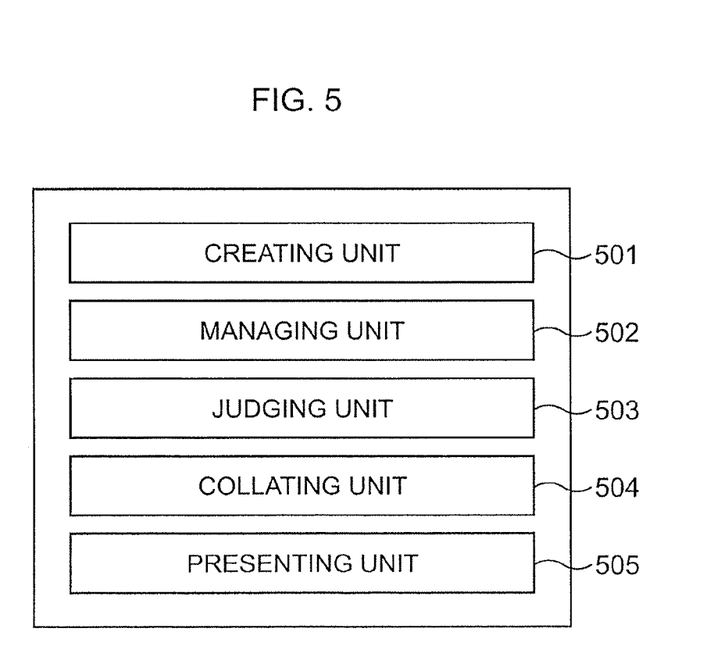
FIG. 5 is a diagram showing an example of a software configuration of the sever device.

FIG. 5 is a diagram showing an example of the software configuration of the sever device 102.

A creating unit 501 creates an electronic contract document in response to an instruction accepted via the display device 309 or an instruction accepted from a PC or the like connected to the sever device 102 via a network. The creating unit 501 stores the created electronic contract document in the HD 304.

A managing unit 502 registers and manages managing information received from the portable terminal device 101 in a managing table described later by using FIG. 7A, FIG. 7B and so on.

A judging unit 503 judges whether or not an allowable condition allowed in the electronic contract using the electronic contract document, that is, an allowable condition by which the electronic contract is qualified as not being questionable, is satisfied, based on the record information recorded in the image data of the electronic contract document where the handwritten electronic signature is recorded. Details of a processing of the judging unit 503 will be described later by using FIGS. 6, 10, and so on.

A collating unit 504 collates the record information included in the managing information registered in the managing table and the record information recorded in the image data included in the managing information. Details of a processing of the collating unit 504 will be described later by using FIG. 6 and so on.

A presenting unit 505 presents a message corresponding to a judgment result by the judging unit 503, a message corresponding to a collation result by the collating unit 504, and the like, by displaying the above in the display device 309, and so on.

Figure 6:
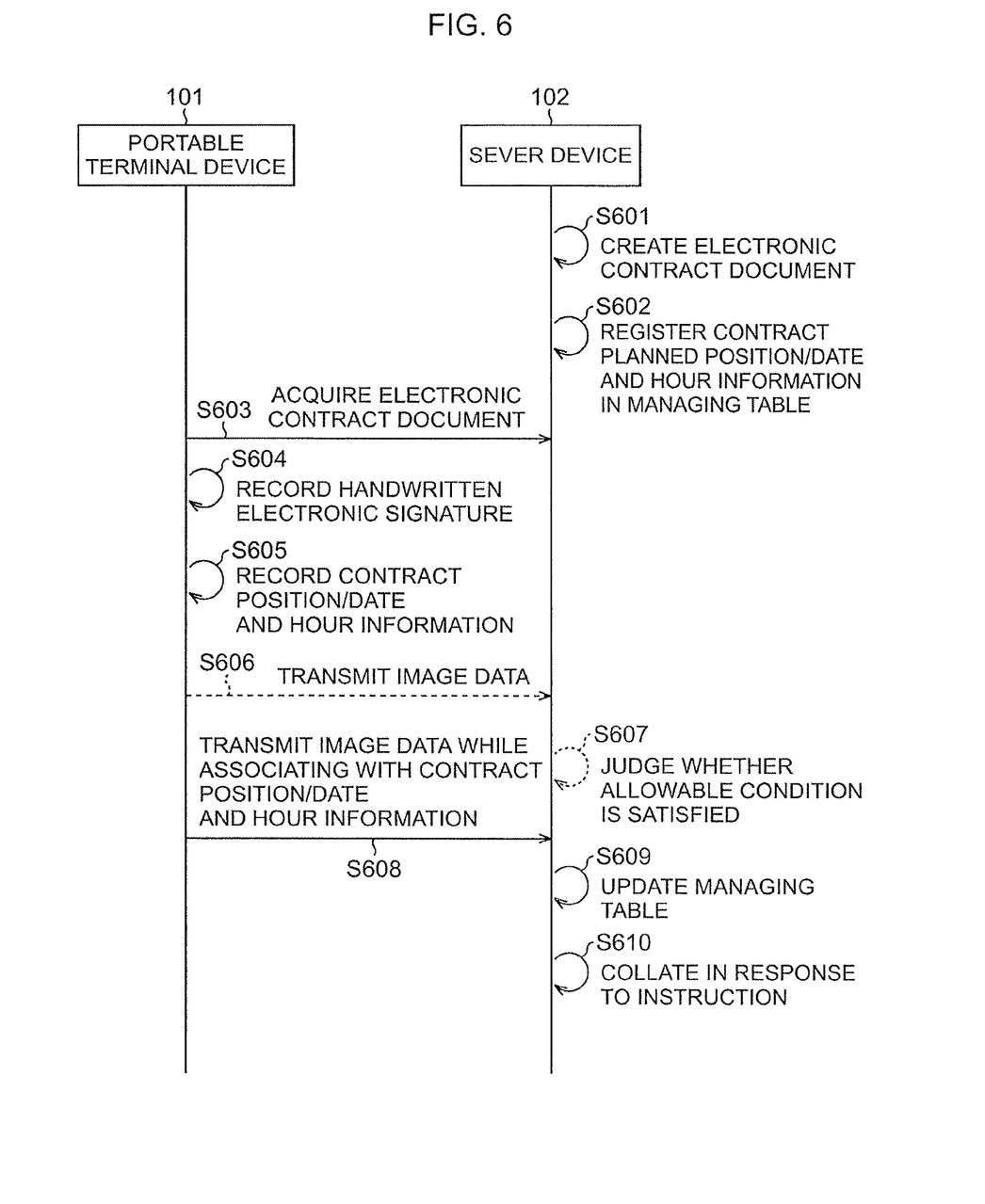
FIG. 6 is a sequence diagram showing an example of processings in the electronic contract system.

FIG. 6 is a sequence diagram showing an example of processings in the electronic contract system of the present embodiment.

In S601, the creating unit 501 creates an electronic contract document in response to an instruction accepted from a manager or a sales personnel of business (hereinafter, collectively referred to as a business operator) via the display device 309 or a PC or the like which is communicable via a network, and stores the electronic contract document in the HD 304. On that occasion, the creating unit 501 supplies an identification ID to identify the electronic contract document and a hash value for identifying a document (hereinafter, referred to as a subject document) to be a subject where a handwritten electronic signature is made. On this occasion, the creating unit 501 creates the hash value based on document data of the subject document.

Here, though it is described that the creating unit 501 creates and stores the electronic contract document and stores the electronic contract document in the HD 304, it is also possible that an electronic contract document acquired from a PC or the like connected to the sever device 102 via a network is stored in the HD 304 in advance.

In S602, the managing unit 502 accepts input regarding the aforementioned contract planned position information indicating the contract planned position where the electronic contract using the electronic contract document is planned to be made and contract planned date and hour information indicating a contract planned date and hour, from the business operator via the display device 309, the communicable PC, or the like. The contract planned date and hour information is an example of transaction planned date and hour information indicating a transaction planned date and hour. More concretely, the contract planned position information also includes information regarding an allowable position range from the contract planned position which is allowed at a time that the contract is made. Further, the contract planned date and hour information also includes information regarding an allowable date and hour range from the contract planned date and hour which is allowed at the time that the contract is made. The allowable position range and the allowable date and hour range here are examples of the allowable condition. Then, the managing unit 502 registers and manages the contract planned position information and the contract planned date and hour information in the managing table on the HD 304 while associating the above information with the identification ID and the hash value supplied in S601.

Examples of the contract planned position includes an address of the party to the contract and an address of a company or an office of the business operator, but the contract planned position may be an address of a place other than the above as long as the business operator and the party to the contract have mutual consent. Further, the contract planned position is not necessarily required to be one but may include a plurality of candidate positions.

Figure 7A:
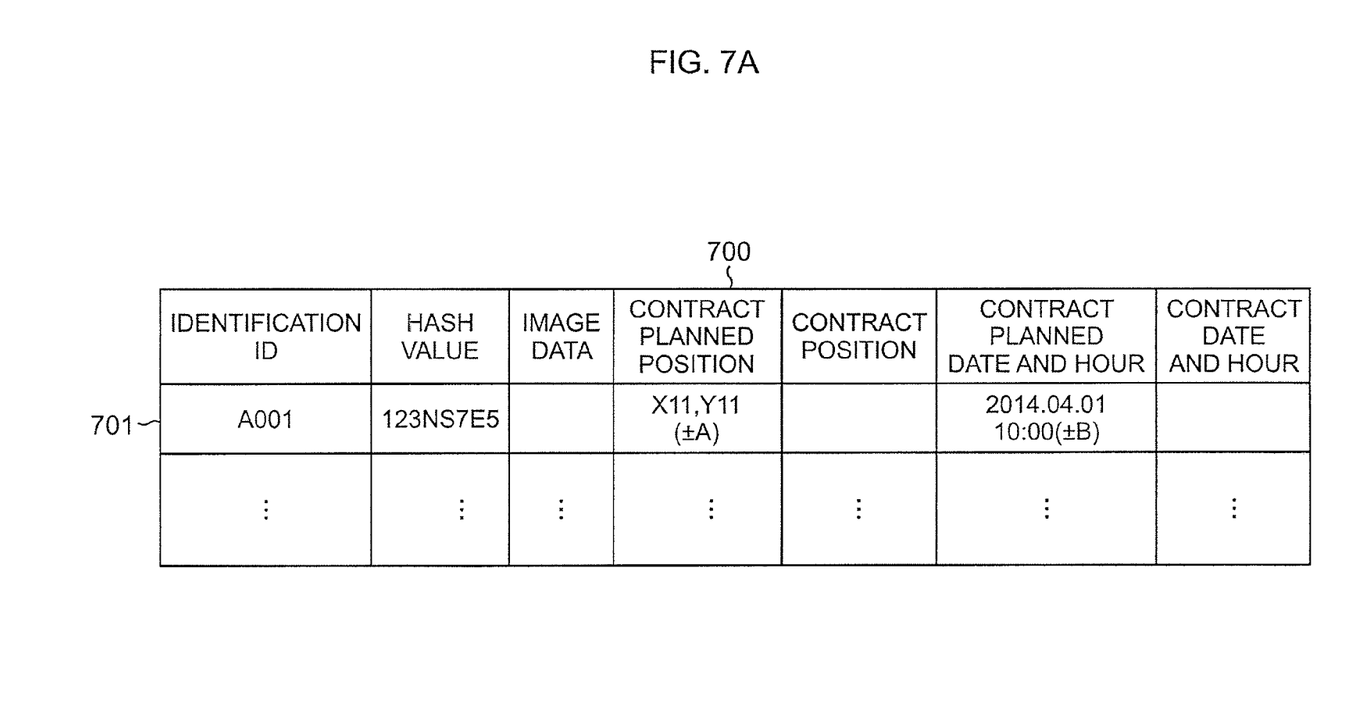
FIG. 7A is a diagram showing an example of a managing table which the sever device manages.
Figure 7B:
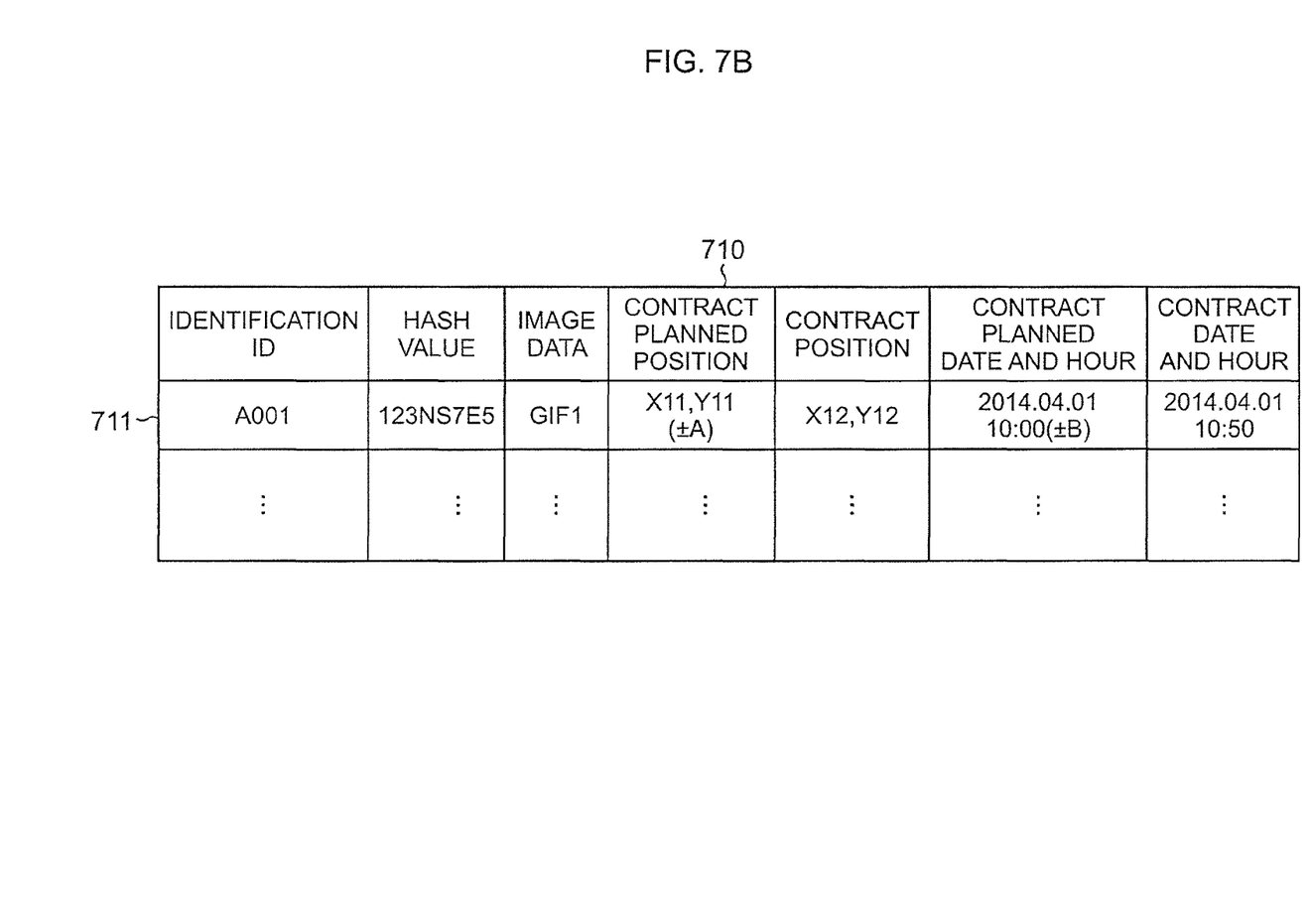
FIG. 7B is a diagram showing an example of the managing table which the sever device manages.

FIG. 7A is a diagram showing an example of a managing table 700 after a processing of S602. A record 701 of the managing table 700 indicates that the identification ID is "A001", that the hash value is "123NS7E5", that the contract planned position is "X11, Y11", that the allowable position range is "±A", that the contract planned date and hour is "2014. 04. 01. 10:00", and that the allowable date and hour range is "±B". The contract planned position "X11, Y11" is a value obtained by converting the address input as the contract planned position information into a coordinate system. The allowable position range and the allowable date and hour range can be each registered in terms of arbitrary unit.

The above processings of S601 to S602 are processings performed in the server device 102 before the electronic contract using the electronic contract document is made.

By processings of S603 and onward below, the electronic contract using the electronic contract document and electronic contract management are performed. The electronic contract management is an example of electronic transaction management.

In S603, the acquiring unit 401 acquires the electronic contract document stored in the sever device 102 via the network such as internet 103. On this occasion, who handles the portable terminal device 101 is the business operator. That is, the acquiring unit 201 acquires the electronic contract document designated via handling of the display device 209 by the business operator, from the server device 102. More concretely, the acquiring unit 401 transmits an acquisition request for screen information to select the electronic contract document to the server device 102, and displays a selection screen of the electronic contract document in the display device 209 based on the screen information accepted as a response. Note that the screen information here may be, for example, information for displaying a web page screen, or may be configuration information of a screen necessary for displaying the screen. Then, the acquiring unit 401 transmits an acquisition request for the electronic contract document selected by the business operator via the selection screen to the server device 102, and acquires the electronic contract document as a response. Then, the business operator gives the portable terminal device 101 to the party to the contract in order for the party to the contract to input a written electronic signature.

Here, though it is described that the acquiring unit 401 acquires the electronic contract document from the server device 102, the electronic contract document may be stored in the HD 204 of the portable terminal device 101 in advance.

Figure 8A:
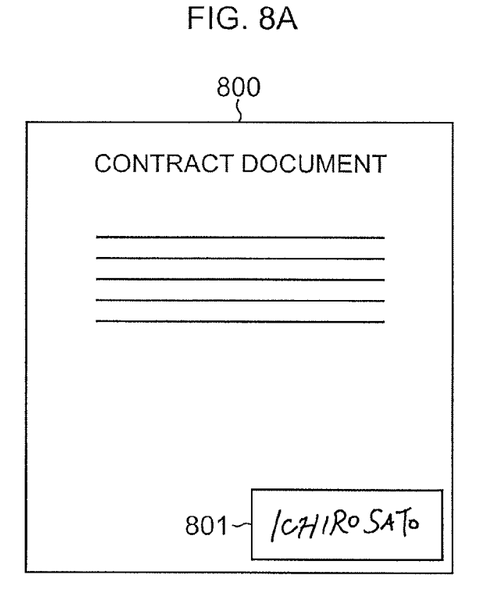
FIG. 8A is a view showing an example of image data of a subject document in an electronic contract document.

In S604, the handwritten electronic signature recording unit 402 records, in the subject document of the electronic contract document acquired in S603, a handwritten electronic signature input by the party to the contract with the stylus pen or the like via the display device 209, and converts the handwritten electronic signature into image data such as GIF (Graphics Interchange Format). FIG. 8A is a view showing an example of image data 800 of the subject document after a processing of S604. In the image data 800, the handwritten electronic signature 801 recorded in S604 is shown.

Figure 9:
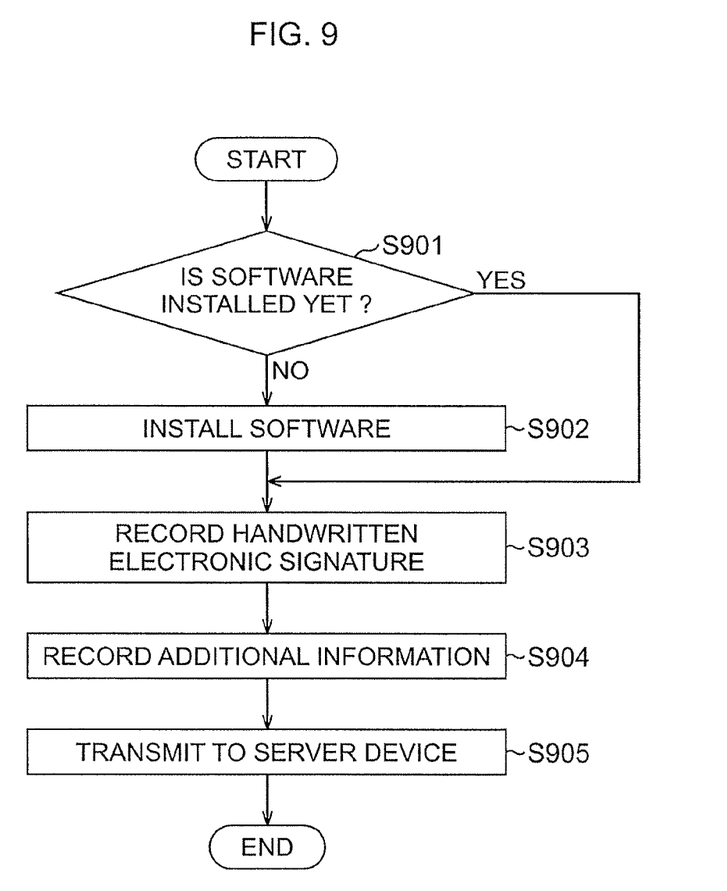
FIG. 9 is a flowchart showing an example of a processing of the portable terminal device.

Here, details of the processing of S604 will be described by using FIG. 9. FIG. 9 is a flowchart showing an example of a recording processing of a handwritten electronic signature.

In S901, the CPU 201, when accepting a request regarding a record of the handwritten electronic signature via the display device 209, judges whether or not software for a handwritten electronic signature, that is, the handwritten electronic signature recording unit 402, is already installed. Then, when judging that the handwritten electronic signature recording unit 402 is already installed, the CPU 201 proceeds the processing to S903, and when judging that the handwritten electronic signature recording unit 402 is not installed yet, the CPU 201 proceeds the processing to S902.

In S902, the CPU 201 acquires a program to materialize the handwritten electronic signature recording unit 402 from the server device 102 via the network such as internet 103 and executes the program, to thereby install the handwritten electronic signature recording unit 402 in the portable terminal device 101.

In S903, the handwritten electronic signature recording unit 402 records the handwritten electronic signature in the subject document, as described in the processing of S604.

In S904, the handwritten electronic signature recording unit 402 records position information (hereinafter, referred to as signature position information) and date and hour information (hereinafter, referred to as signature date and hour information) at a time that the handwritten electronic signature is recorded in S903, in the subject document as additional information, and converts the above into image data such as GIF. On this occasion, the handwritten electronic signature recording unit 402 may record a timestamp as the signature date and hour information. Here, the handwritten electronic signature recording unit 402 acquires the signature position information via the GPS 210. Further, the handwritten electronic signature recording unit 402 acquires the timestamp indicating the signature date and hour information from a timestamp server device communicable with the portable terminal device 101. A signature position which the signature position information indicates is the same position as a contract position which the aforementioned contract position information indicates. Further, a signature date and hour which the signature date and hour information indicates is the same date and hour as a contract date and hour which the aforementioned contract date and hour information indicates. The signature position information and the signature date and hour information are recorded as the additional information in S904, in order that validity of the handwritten electronic signature can be confirmed later. That is, it is for the purpose of making it possible to confirm whether the handwritten electronic signature is one made by image pasted by unauthorized person or whether the handwritten electronic signature is one having been falsified.

In S905, the transmitting unit 404 transmits, to the server device 102, the image data of the handwritten electronic signature recorded in S903, the additional information recorded in S904, and the hash value to identify the subject document where the handwritten electronic signature is recorded, while associating the above, and then ends a processing of FIG. 9. Thereby, the same information as the handwritten electronic signature and the additional information recorded in the subject document is to be managed in the server device 102, so that it is possible to confirm validity of the handwritten electronic signature by collating the above information as necessary.

Note that in the present embodiment, it is described that both the signature position information and the signature date and hour information are recorded as the additional information, but only the signature date and hour information, for example, may be recorded as the additional information.

Further, if validity of the handwritten electronic signature can be confirmed by collation, information recorded as the additional information is not necessarily required to be limited to the signature position information or the signature date and hour information. For example, information indicating that the handwritten electronic signature is surely recorded by the handwritten electronic signature recording unit 402 may be recorded as the additional information. That is, information indicating that an unauthorized person has not recorded the handwritten electronic signature by using other software than designated software may be recorded as the additional information.

FIG. 6 is explained again.

Figure 8B:
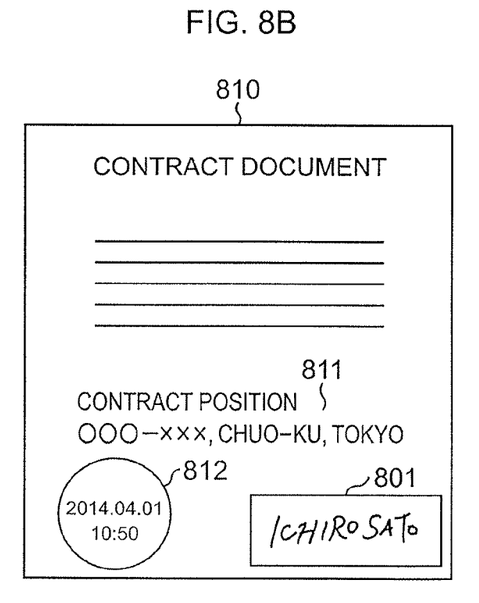
FIG. 8B is a view showing an example of the image data of the subject document in the electronic contract document.

In S605, the information recording unit 403 records the contract position information and the contract date and hour information at the time that the handwritten electronic signature is recorded as record information, in the image data where the handwritten electronic signature is recorded and converted into GIF or the like in S604. On this occasion, the information recording unit 403 records the timestamp as contract date and hour information. The contract date and hour information and the contract position information are information similar to the signature position information and the signature date and hour information described in S904 of FIG. 9. The information recording unit 403 may acquire the contract date and hour information and the contract position information by a method similar to the method described in S904 of FIG. 9, or may use the signature position information and the signature date and hour information acquired in S904 without change. FIG. 8B is a view showing an example of image data 810 of the subject document after a processing of S605. In the image data 810, in addition to the handwritten electronic signature 801 recorded in S604, contract position information 811 and a timestamp 812 indicating the contract date and hour information which are recorded in S605 are indicated.

In S606, the transmitting unit 404 transmits the image data where the record information is recorded in S605, to the server device 102. That is, the transmitting unit 404 transmits the image data of the subject document where the handwritten electronic signature and the record information are recorded to the server device 102.

In S607, the judging unit 503 judges whether or not the allowable condition is satisfied in the electronic contract based on the image data received from the portable terminal device 101 in S606. Note that timings of the processings of S606 and S607 are not necessarily limited to timings indicated in FIG. 6 and the processing may be performed at a timing of later-described S608 and onward, for example.

Figure 10:
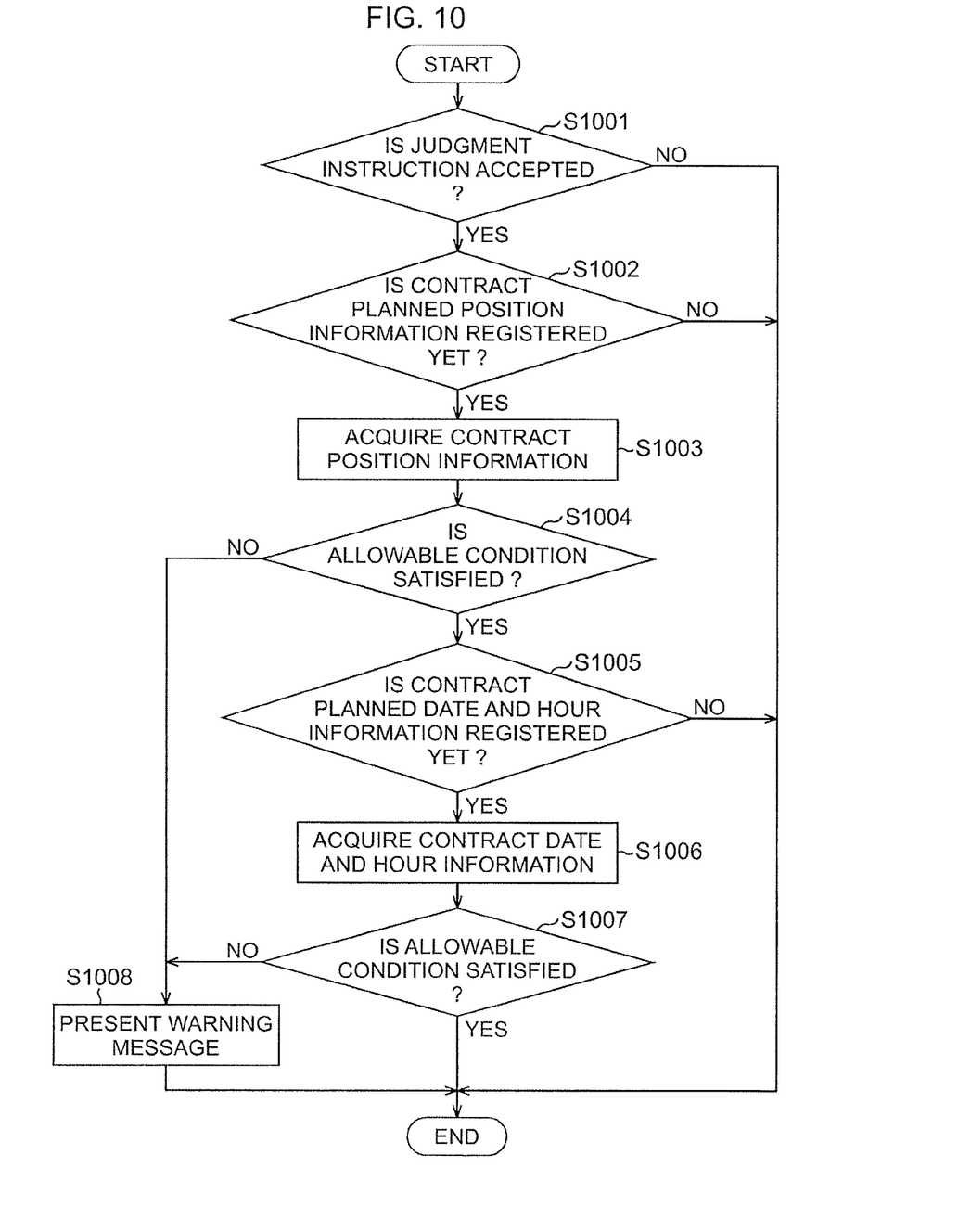
FIG. 10 is a flowchart showing an example of a processing of the server device.

Here, details of a processing of S607 will be described by using FIG. 10. FIG. 10 is a flowchart showing an example of a judgment processing regarding whether or not the allowable condition is satisfied.

In S1001, the judging unit 503 judges whether or not a judgment instruction regarding whether or not the allowable condition in the electronic contract is satisfied is accepted from the business operator via the display device 309 or a communicable PC. More concretely, the judging unit 503 judges whether or not the judgment instruction regarding whether or not the designated electronic contract satisfies the allowable condition is accepted, based on the identification ID and the hash value. Then, the judging unit 503, when judging that the judgment instruction is accepted, proceeds a processing to S1002, and when judging that the judgment instruction is not accepted, ends the processing of FIG. 10.

In S1002, the judging unit 503 judges whether or not the contract planned position information is already registered in the managing table on the HD 304, regarding the designated electronic contract. Then, the judging unit 503, when judging that the contract planned position information is already registered, proceeds the processing to S1003, and when judging that the contract planned position information is not registered yet, ends the processing of FIG. 10.

In S1003, the judging unit 503 acquires the contract position information recorded as the record information in the image data received from the portable terminal device 101 in S606, regarding the designated electronic contract.

In S1004, the judging unit 503 judges whether or not the allowable condition is satisfied based on the contract planned position information judged to be already registered in S1002 and the contract position information acquired in S1003. A processing of S1004 will be described more concretely by using examples of FIG. 7A and FIG. 8B. First, it is assumed that a value of an allowable position range "±A" in the managing table 7A of FIG. 7A is ±50 (m). Further, it is assumed that a value obtained by converting the contract position information 811 shown in FIG. 8B, i.e., "○○○-XXX, Chuo-ku, Tokyo", into a coordinate system is "X12, Y12". In this case, the judging unit 503 judges whether or not "X12, Y12" is within a range of "X11±50 m, Y11±50 m". Then, the judging unit 503, when judging that "X12, Y12" is within the range, regards the allowable condition as being satisfied and proceeds the processing to S1005, and when judging that "X12, Y12" is not within the range, regards the allowable condition as not being satisfied and proceeds the processing to S1008. As described above, the judging unit 503 compares the contract planned position information registered in advance with the contract position information at the time that the electronic contract is actually made, whereby the judging unit 503 can judge whether or not the electronic contract satisfies the allowable condition. Thereby, the business operator can distinguish a questionable electronic contract which does not satisfy the allowable condition. Further, the business operator can make the allowable condition in the electronic contract strict or mild by changing the contract planned position information. Thus, the business operator can set an appropriate allowable condition in correspondence with the kind of the electronic contract, such as making the allowable condition stricter as an amount of money dealt in the electronic contract becomes higher, for example.

In S1008, the presenting unit 505 displays and presents a warning message telling the allowable condition is not satisfied in the display device 309. Further, the presenting unit 505 may transmit the warning message to the portable terminal device 101 to be presented therein, or may transmit the warning message to a PC or the like communicably connected to the server device 102 via a network to be presented therein. Thereby, the business operator can get a grasp on a questionable electronic contract among electronic contracts made by using electronic contract documents.

In S1005, the judging unit 503 judges whether or not the contract planned date and hour information is already registered in the managing table, regarding the designated electronic contract. Then, the judging unit 503, when judging that the contract planned date and hour is already registered, proceeds the processing to S1006, and when judging that the contract planned date and hour is not registered yet, ends the processing of FIG. 10.

In S1006, the judging unit 503 acquires the contract date and hour information recorded as the record information in the image data received from the portable terminal device 101 in S606, regarding the designated electronic contract.

In S1007, the judging unit 503 judges whether or not the allowable condition is satisfied based on the contract planned date and hour information judged to be already registered in S1005 and the contract date and hour information acquired in S1006. A processing of S1007 will be described more concretely by using the examples of FIG. 7A and FIG. 8B. First, it is assumed that a value of an allowable date and hour range "±B" in the managing table 700 of FIG. 7A is ±5 (hours). In this case, the judging unit 503 judges whether or not a contract date and hour "2014.04.01. 10:50" which a timestamp 812 shown in FIG. 8B indicates is within a range of "2014.04.01 10:00±5 hours". In a case of this example, the judging unit 503 judges that the contract date and hour is within the range and ends a processing of FIG. 10. Meanwhile, if the value of the allowable date and hour range "±B" is ±0.5 (hours), the judging unit 503 judges that the allowable condition is not satisfied in S1007 and proceeds the processing to S1008. Note that the processing of S1008 is described above, and explanation thereof is omitted. As described above, the judging unit 503 can judge whether or not the allowable condition is satisfied not only by the contract position but also by taking the contract date and hour into consideration. Thereby, the judging unit 503 can distinguish the questionable electronic contract under stricter allowable condition. Further, the business operator can set the allowable condition more flexibly in correspondence with circumstances by changing the contract planned position information and the contract planned date and hour information.

Note that though in the present embodiment it is judged whether or not both the contract position and the contract date and hour at the time that the contract is made satisfy the allowable condition, it is not necessarily required to limit to the above. For example, it is possible to judge whether or not the allowable condition is satisfied by considering either one of the contract position and the contract date and hour. That is, in the processings of S1002 to S1007 shown in FIG. 10, it is possible to configure that either ones of the processings of S1002 to S1004 and the processings of S1005 to S1007 are performed.

FIG. 6 is explained again.

In S608, the transmitting unit 404 associates the record information to the image data where the record information is recorded in S605 and transmits to the server device 102 as managing information. That is, the transmitting unit 404 associates the record information with the image data of the subject document where the handwritten electronic signature and the record information are recorded and transmits to the server device 102 as the managing information.

In S609, the managing unit 502 updates the managing table 700 shown in FIG. 7A based on the managing information received from the portable terminal device 101 in S608. FIG. 7B is a diagram showing an example of the managing table 710 after a processing of S609. In a record 711 of the managing table 710, in addition to the information recorded in the record 701 of the managing table 700, image data "GIF 1" of the subject document where the handwritten electronic signature and the record information are recorded, the contract position information indicating that the contract position is "X12, Y12", and the contract date and hour information indicating that the contract date and hour is "2014.04.01. 10:50" are updated and recorded. That is, as a result of the processing of S609, the image data of the subject document where the handwritten electronic signature and the record information are recorded, and the contract position information and the contract date and hour information, i.e., the record information, are updated and recorded in the managing table 710. Thereby, the server device 102 can collate the record information in the subject document of the electronic contract document with the record information registered in the managing table. That is, the server device 102 can manage information for making it possible to confirm whether the electronic contract made by using the electronic contract document is unquestionable, in the managing table.

In S610, the collating unit 504, when accepting a collation instruction from the business operator via the display device 309, a communicable PC, or the like, collates the record information recorded in the image data "GIF 1" registered in the managing table 710 with the record information registered in the managing table 710. Then, the presenting unit 505 displays and presents a collation result by the collating unit 504 in the display device 309, transmits and the collation result by the collating unit 504 to a PC communicably connected to the server device 102 via a network, so as to be presented. Thereby, the business operator can confirm whether or not the electronic contract is valid, as necessary. More concretely, as a result of collation by the collating unit 504, if the contract position information and the contract date and hour information recorded in the image data coincide with the contract position information and the contract date and hour information registered in the managing table 710, the business operator can confirm that the electronic contract is free from falsification and is valid. Meanwhile, in a case of not coinciding with each other, the business operator can confirm that the electronic contract may not be valid.

Hereinabove, according to the present embodiment, even a light user for personal use or the like can use an electronic contract without trouble. More concretely, it is possible to compare the contract position information or the like recorded in the subject document of the electronic contract document with the contract planned position information registered in advance to thereby judge whether or not the allowable condition in the electronic contract is satisfied, and it is possible to collate the contract position information or the like recorded in the subject document with the contract position information or the like registered in the managing table of the server device 102, so that it becomes unnecessary to use an electronic certificate which has been used for solving the problem of identification and falsification in the conventional electronic contract. Therefore, it is possible to save the trouble of preparation for using the electronic certificate, enabling even the light user for personal use or the like to make the electronic contract without trouble.

Further, since a stamp tax does not occur in an electronic contract using an electronic contract document, a cost can be curtailed by tax saving compared with a conventional contract using a paper document.

Further, by the processing of the present embodiment, in the electronic contract system, compared with an electronic contract using an electronic certificate, it is possible to reduce a load of a resource such as CPU, the load applied in a confirmation processing based on the electronic certificate. Further, in the electronic contract system, it becomes unnecessary to record a coding/decoding key used for a confirmation processing based on the electronic certificate, so that a memory area to be used therefore can be reduced.

The present embodiment is explained by exemplifying the contract document as an example of the electronic document used in a transaction. Further, explanation is done by exemplifying the electronic contract system as an example of the managing system to manage the electronic document. However, the processing of the present embodiment is not limited only to the contract document or the electronic contract system. Here, the electronic document used in the transaction means a document for forming an agreement between two or more parties concerned in the transaction, or a document for one of the parties concerned in the transaction to clearly specify, to notify, or to explain information to the other party concerned. More concretely, the electronic documents used for the transaction may be, other than the contract document, a provision, a memorandum, a letter of acceptance, a statement of mutual understanding, an order sheet, an order acknowledgement, a purchase order, an unofficial announcement letter, a written price estimate, a receipt, a bill, a delivery receipt, a statement of delivery, an acceptance inspection sheet, a confirmation note, a deposit receipt, a notification, a notification of payment, a letter of attorney, a statement of important matters, and so on.

In a case where the processing of the present embodiment is adapted also to a managing system to manage an electronic document other than the electronic contract document, the managing system records an electronic signature of a party concerned in the electronic document, and manages image data of the electronic document where the electronic signature is recorded and record information including position information of a transaction place while associating the image data with the record information.

Other Embodiments

In the embodiment 1, the electronic contract system which includes the portable terminal device 101 and the server device 102 is described, but the portable terminal device 101 and the server device 102 may be made of one body. That is, the processing in the electronic contract system described in the embodiment 1 may be performed by a portable terminal device 101 having a function of a server device 102.

Further, though the embodiment 1 is described under the assumption that a terminal device used in making an electronic contract is the portable terminal device 101 which is conveyable, an information processing apparatus which cannot be conveyed may be used if a GPS is mounted thereon.

Further, in the embodiment 1, it is described that the contract planned position information is registered in advance before the electronic contract is made, but the contract planned position information is not necessarily required to be registered in advance. For example, it is possible that position information of a place on which a party to a contract and a business operator agree is registered instead of contract planned position information after the electronic contract is made, to be compared with contract position information recorded in image data of a subject document in an electronic contract document. Thereby, even in a case where contract planned position information is not registered in advance before an electronic contract is made, a processing similar to that in the embodiment 1 becomes possible.

Further, in the embodiment 1, the judging unit 503 judges whether or not the allowable condition is satisfied based on the contract planned position information and the contract planned date and hour information which are registered in advance and the actual contract position information and contract date and hour information in S607. However, the judging unit 503 may perform the following processing. That is, the judging unit 503 may acquire information of a party to a contract, such as an address and a telephone number of the party to the contract from the portable terminal device 101, to thereby judge whether or not the party to the contract is appropriate based on the acquired information of the party to the contract, and may judge that an allowable condition of the contract is not satisfied in a case where the party to the contract is not appropriate.

The judging unit 503 judges that the party to the contract is not appropriate if the address of the party to the contract is an address of a person different from the party to the contract or a dummy address, for example. Further, in a case where the managing system prepares a database for recording information of appropriate persons to make contracts with in advance, the judging unit 503 can judge whether or not a person to a contract is appropriate by collating information such as an address or a telephone number of the party to the contract with the information in that database, for example.

Further, in the embodiment 1, the information recording unit 403 records the record information including the contract position information and the contract date and hour information in the image data of the electronic contract document where the handwritten electronic signature is recorded. However, it is possible that the information recording unit 403 records record information including biometric information of a party to a contractor in image data of an electronic contract document where a handwritten electronic signature is recorded.

For example, at a time of recording the handwritten electronic signature of the party to the contract, the portable terminal device 101 acquires fingerprint information or retina information of the party to the contract via a built-in camera or the like, and transmits record information including the acquired fingerprint information or retina information to the server device 102. The information recording unit 403 may then record the transmitted record information in image data of an electronic contract document where a handwritten electronic signature is recorded. Further, the portable terminal device 101 may acquire vein information of a user via an external vein sensor and transmit the record information including the acquired vein information to the server device 102.

Further, it is possible that the information recording unit 403 records, in image data of an electronic contract document where a handwritten electronic contract document is recorded, record information including identification information other than biometric information of a party to a contract. For example, at a time of recording the handwritten electronic signature of the party to the contract, the portable terminal device 101 photographs an official certificate such as a driver's license of the party to the contract together with the party to the contract via a built-in camera or the like. Then, the portable terminal device 101 transmits record information including photographed image data to the sever device 102. The information recording unit 403 may then record the transmitted record information in image data of the electronic contract document where the handwritten electronic signature is recorded.

Further, for example, at a time of recording a handwritten electronic signature of a party to a contract, the portable terminal device 101 photographs and records the party to the contract via build-in camera, microphone, and so on. The portable terminal device 101 then transmits record information including moving image information (image data and voice information of the party to the contract) of the photographed party to the contract to the server device 102. The information recording unit 403 may then record the transmitted record information in image data of an electronic contract document where the handwritten electronic signature is recorded.

Further, for example, at a time of recording a handwritten electronic signature of a party to a contract, the managing system issues a personal identification number to the portable terminal device 101 (a portable terminal owned by the party to the contract or a portable terminal of a person in charge of the contract), and transmits the issued personal identification number to the portable terminal device 101. The portable terminal device 101 transmits record information including the transmitted personal identification number to the server device 102. The information recording unit 403 may then record the transmitted record information in image data of the electronic contract where the handwritten electronic signature is recorded. In such a case, the managing system uses the personal identification number issued to the portable terminal device 101 as one of identification information of the party to the contract.

Further, the embodiment 1 is described by exemplifying a case of one contract planned position, but the server device 102 may register a plurality of candidate contract planned position information in S602 to judge whether or not any one of the plurality of contract planned position information satisfies an allowable condition in S607. This improves convenience for both party to a contract and business operator at a time that an electronic contract is made.

Further, in the embodiment 1, though it is described that both contract position information and contract date and hour information are recorded in the subject document where the handwritten electronic signature is recorded, but it is not necessarily required that both are recorded and only either one may be recorded. In this case, it suffices that either one of the contract planned position information and the contract planned date and hour information is registered in the managing table. That is, each processing described in the embodiment 1 may be performed without considering the contract date and hour but considering only the contract position.

Further, the aforementioned embodiment can be materialized also by performing the following processing. That is, in the processing, software (program) materializing the function of the aforementioned embodiment is supplied to a system or a device via a network or various recording media and a computer (or a CPU, an MPU or the like) of that system or device reads and execute the program.

Hereinabove, according to each embodiment described above, even a light user for personal use or the like comes to be able to use an electronic contract without trouble.

The invention claimed is:

1. A managing system comprising a first processor, a second processor, a first recording device, and a second recording device,
    wherein the first processor accepts a handwritten electronic signature by a transactor and records the handwritten electronic signature in an electronic document recorded in the first recording device;
    the first processor records first record information including transaction position information at a position that the handwritten electronic signature is recorded, in image data of the electronic document where the handwritten electronic signature is recorded, the image data being recorded in the first recording device,
    the second processor records second record information including the transaction position information and the image data where the first record information is recorded in the second recording device, while associating the second record information with the image data and manages the second record information and the image data as managing information; and
    the second processor judges whether or not an allowable condition in a transaction using the electronic document is satisfied in correspondence with whether or not a transaction position indicated by the transaction position information included in the first record information recorded in the second recording device is within an allowable position range from a transaction planned position indicated by transaction planned position information having been registered in the second recording device in advance, and
    the second processor, when accepting a collation instruction, collates the second record information included in the managing information recorded in the second recording device with the first record information recorded in the image data included in the managing information.

2. The managing system according to claim 1,
    wherein the second processor, when accepting the collation instruction, collates the second record information included in the managing information recorded in the second recording device with the first record information recorded in the image data included in the managing information and presents a collation result.

3. The managing system according to claim 1,
    wherein the first processor records the first record information which further includes transaction date and hour information at a time that the handwritten electronic signature is recorded, in the image data, and
    wherein the second processor judges whether or not the allowable condition is satisfied, in correspondence with whether or not a transaction date and hour indicated by the transaction date and hour information included in the first record information is within an allowable date and hour range from a transaction planned date and hour indicated by transaction planned date and hour information having been registered in advance and the transaction position is within the allowable position range.

4. The managing system according to claim 1,
    wherein the second processor presents a warning message when it is judged that the allowable condition is not satisfied.

5. The managing system according to claim 1,
    wherein the first processor accepts the handwritten electronic signature by a party to a contract being the transactor and records the handwritten electronic signature in an electronic contract document being the electronic document, and
    wherein the first processor records the first record information including contract position information being the transaction position information at the position that the handwritten electronic signature is recorded, in the image data of the electronic contract document where the handwritten electronic signature is recorded.

6. A portable terminal device comprising a processor and a recording device,
    wherein the processor accepts a handwritten electronic signature by a transactor and records the handwritten electronic signature in an electronic document recorded in the recording device,
    the processor records first record information including transaction position information at a position that the handwritten electronic signature is recorded, in image data of the electronic document where the handwritten electronic signature is recorded, the image data being recorded in the recording device, and the processor transmits second record information including the transaction position information and the image data where the first record information is recorded as managing information, while associating the second record information with the image data as information used for collation.

7. A managing method performed by a managing system comprising a first processor, a second processor, a first recording device, and a second recording device, the managing method comprising:

a first recording step of, by the first processor, accepting a handwritten electronic signature by a transactor and recording the handwritten electronic signature in an electronic document recorded in the first recording device;

a second recording step of, by the first processor, recording first record information including transaction position information at a position that the handwritten electronic signature is recorded, in image data of the electronic document where the handwritten electronic signature is recorded in the first recording step, the image data being recorded in the first recording device;

a third recording step of, by the second processor, recording second record information recorded in the second recording step including the transaction position information and the image data where the first record information is recorded as managing information in the second recording device, while associating the second record information with the image data;

a judging step of, by the second processor, judging whether or not an allowable condition in a transaction using the electronic document is satisfied in correspondence with whether or not a transaction position indicated by the transaction position information included in the first record information recorded in the second recording step is within an allowable position range from a transaction planned position indicated by transaction planned position information having been registered in advance; and a collating step of, by the second processor, when accepting a collation instruction, collating the second record information included in the managing information recorded in the second recording device with the first record information recorded in the image data included in the managing information.

8. An information processing method performed by a portable terminal device comprising a processor and a recording device, the information processing method comprising:

a first recording step of, by the processor, accepting a handwritten electronic signature by a transactor and recording the handwritten electronic signature in an electronic document recorded in the recording device;

a second recording step of, by the processor, recording first record information including transaction position information at a position that the handwritten electronic signature is recorded, in image data of the electronic document where the handwritten electronic signature is recorded in the first recording step, the image data being recorded in the recording device; and a transmitting step of, by the processor, transmitting second record information recorded in the second recording step including the transaction position information and the image data where the first record information is recorded as managing information, while associating the second record information with the image data as information used for collation.

9. A non-transitory computer readable recording medium recording a program product for a computer to execute:

a first recording step of, by a processor, accepting a handwritten electronic signature by a transactor and recording the handwritten electronic signature in an electronic document recorded in a recording device;

a second recording step of, by the processor, recording first record information including transaction position information at a position that the handwritten electronic signature is recorded, in image data of the electronic document where the handwritten electronic signature is recorded in the first recording step, the image data being recorded in the recording device; and a transmitting step of, by the processor, transmitting second record information recorded in the second recording step including the transaction position information and the image data where the first record information is recorded as managing information, while associating the second record information with the image data as information used for collation.

10. A non-transitory computer readable recording medium recording a program product for a computer to execute:

a first recording step of accepting a handwritten electronic signature by a transactor and recording the handwritten electronic signature in an electronic document;

a second recording step of recording first record information including transaction position information at a position that the handwritten electronic signature is recorded, in image data of the electronic document where the handwritten electronic signature is recorded in the first recording step; and a transmitting step of transmitting second record information recorded in the second recording step including the transaction position information and the image data where the first record information is recorded as managing information, while associating the second record information with the image data.

* * * * *